United States Patent
Fujiu

[11] Patent Number: 5,199,319
[45] Date of Patent: Apr. 6, 1993

[54] TILT TELESCOPIC STEERING DEVICE

[75] Inventor: Isao Fujiu, Kiryu, Japan

[73] Assignee: Kabushiki Kaisha Yamada Seisakusho, Gunma, Japan

[21] Appl. No.: 834,121

[22] Filed: Feb. 13, 1992

[30] Foreign Application Priority Data

Feb. 15, 1991 [JP] Japan .................................. 3-42336

[51] Int. Cl.⁵ .............................................. B62D 1/18
[52] U.S. Cl. ........................................ 74/493; 280/775
[58] Field of Search ................... 74/493, 531; 280/775

[56] References Cited

U.S. PATENT DOCUMENTS

| | | | |
|---|---|---|---|
| 4,649,769 | 3/1987 | Venable | 74/493 |
| 4,774,851 | 10/1988 | Iwanani et al. | 74/531 X |
| 4,915,412 | 4/1990 | Yuzuriha et al. | 280/775 |
| 5,088,767 | 2/1992 | Hoblingre et al. | 74/493 X |
| 5,117,707 | 6/1992 | Kinoshita et al. | 74/493 |

FOREIGN PATENT DOCUMENTS

| | | | |
|---|---|---|---|
| 178470 | 8/1987 | Japan | 74/493 |
| 134370 | 6/1988 | Japan | 280/775 |
| 67778 | 3/1991 | Japan | 74/493 |
| 2116496 | 9/1983 | United Kingdom | 74/493 |

*Primary Examiner*—Richard M. Lorence
*Assistant Examiner*—Khoi Q. Ta
*Attorney, Agent, or Firm*—Lowe, Price, LeBlanc & Becker

[57] ABSTRACT

A device capable of pivotally and axially adjusting by a single operation a steering shaft having a steering wheel. The device includes fixed tilting brackets having descending portions positioned on both sides of a slidable inner cylinder connected to the steering shaft, and a raising/lowering bracket which is attached to the fixed brackets so as to pivotally adjust the steering shaft, and which can ascend and descend together with a steering column. The raising/lowering bracket is attached to the fixed tilting brackets by tightening a screw bar, whereas it can ascend and descend by loosening the screw bar. When the screw bar is tightened, a pressing piece supported by the screw bar pushes the slidable inner cylidner, thereby controlling the movement of the steering shaft in the axial direction of the shaft. On the other hand, when the screw bar is loosened, pressing force is released to permit the steering shaft to move in the axial direction.

5 Claims, 9 Drawing Sheets

F I G. 14
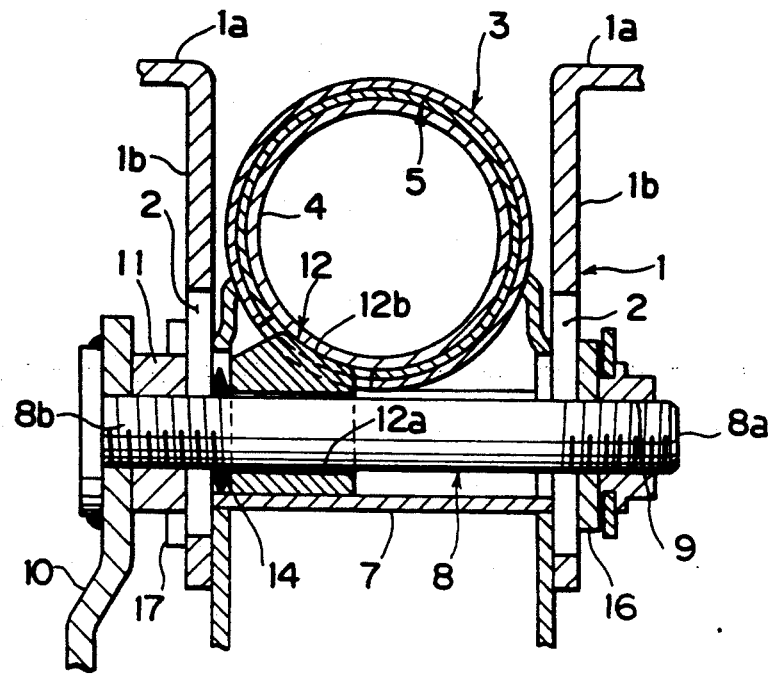
F I G. 15
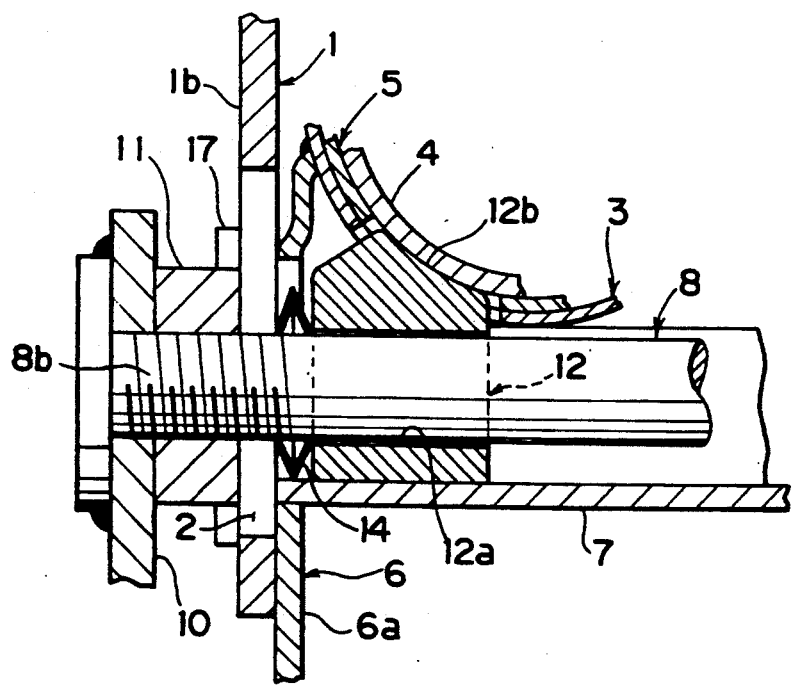

TILT TELESCOPIC STEERING DEVICE

BACKGROUND OF THE INVENTION

1. Field of the Invention

The present invention relates to a tilt telescopic steering device capable of simultaneously tilting (pivotally adjusting) and telescoping (axially adjusting) a steering wheel so that it readily conforms to the position preferred by the driver.

2. Prior Art

There is a type of tilt telescopic steering device which is provided with a tilt mechanism (column swing type) in which the lower end of a steering column is pivoted to enable the position of the steering wheel to be adjusted pivotally and fixed; a telescopic mechanism for axially adjusting and fixing the position of the steering wheel; and levers for adjusting and fixing the steering wheel in the tilt and telescopic mechanisms.

When the position of the steering wheel is adjusted either pivotally or axially, the adjusting and fixing lever in either the tilt or telescopic mechanism must be locked or released to adjust the steering wheel either pivotally or axially. These adjustments are carried out independently of each other. In other words, the steering wheel is first adjusted pivotally and then axially, or vice versa.

For this reason, adjusting the steering wheel is complicated, thus making it difficult to adjust the wheel to the position preferred by the driver. Also, adjusting and fixing mechanisms require many components, thus increasing the cost and weight thereof.

SUMMARY OF THE INVENTION

The object of the present invention is therefore to provide a tilt telescopic steering device capable of pivotally and axially adjusting a steering wheel by a single operation while reducing the number and weight of the components thereof as much as possible.

To achieve the above object, according to this invention, there is provided a tilt telescopic steering device comprising: a slidable inner cylinder connected to a steering shaft having a steering wheel at one end of the shaft; a steering column supporting the slidable inner cylinder so that the slidable inner cylinder can move in an axial direction thereof, an opening being formed in a portion of the steering column; fixed tilting brackets, which include a pair of descending portions, formed so that the brackets can hold a shaft portion of the steering column; a raising/lowering bracket which is connected to the steering column and provided so that it can move up and down relative to the fixed tilting brackets, this raising/lowering bracket having a guide member extending in a horizontal direction; a screw bar penetrating the fixed tilting brackets and the raising/lowering bracket, the raising/lowering bracket being fixable with respect to the fixed tilting brackets by tightening this screw bar; and a pressing piece supported by the screw bar and movable along the guide member, a portion of this pressing piece being formed as a surface which is capable of pushing an outer surface of the slidable inner cylinder through the opening in the steering column.

BRIEF DESCRIPTION OF THE DRAWINGS

FIG. 14 is a vertical sectional view essentially showing a fifth embodiment;

FIG. 15 is an enlarged sectional view of essential components shown in FIG. 14;

DESCRIPTION OF THE PREFERRED EMBODIMENTS

Figure 1:
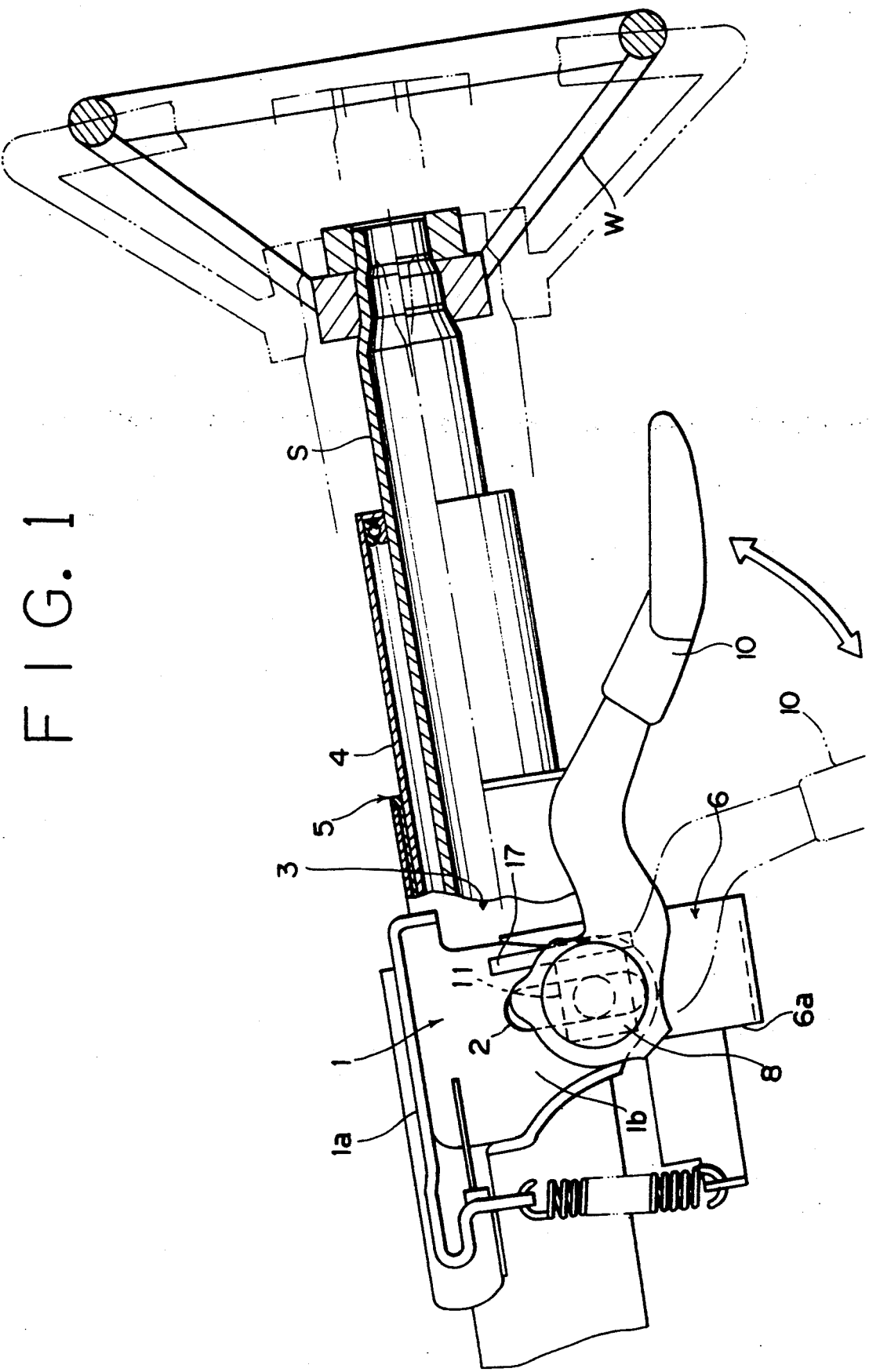
FIG. 1 is a front view showing a first embodiment of a tilt telescopic steering device according to the present invention.
Figure 2:
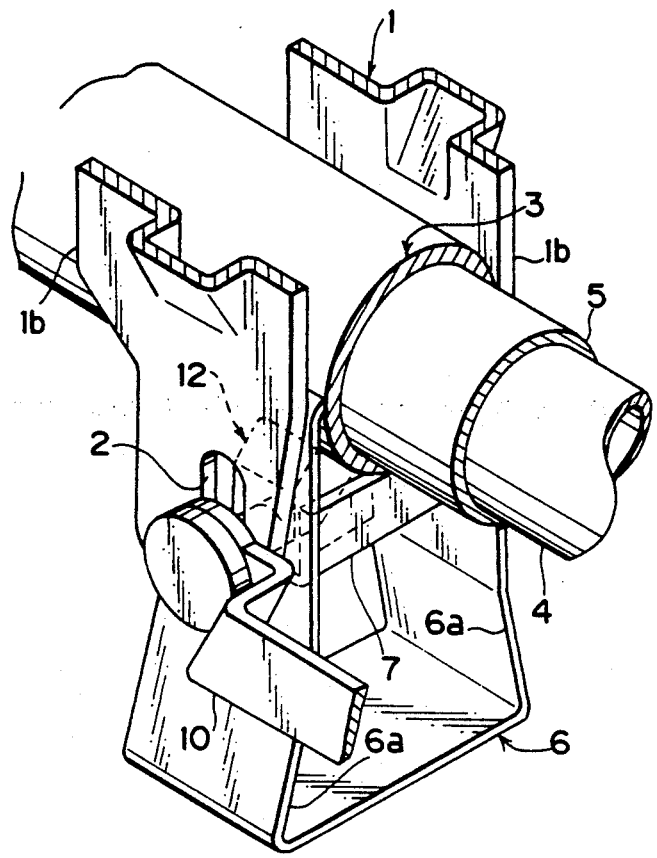
FIG. 2 is a perspective view essentially showing the steering device in the first embodiment.
Figure 3:
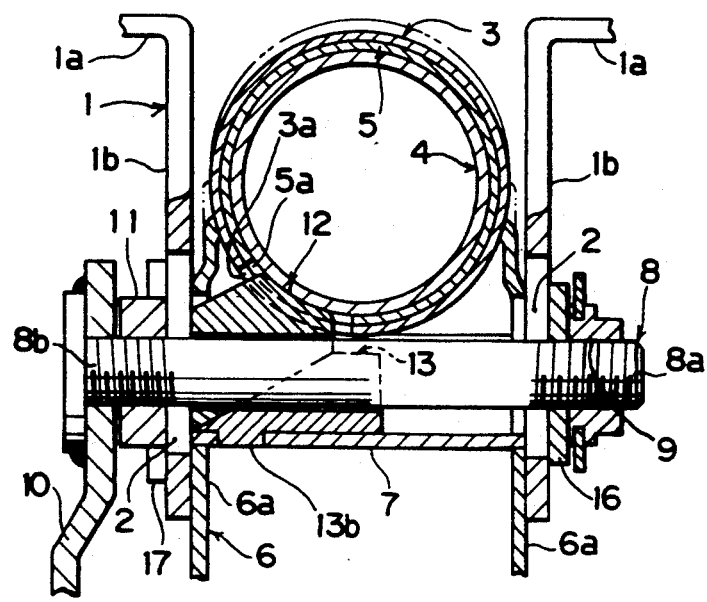
FIG. 3 is a vertical sectional view of FIG. 2.

The preferred embodiments of the present invention will be described below with reference to the drawings. A first embodiment is shown in FIGS. 1 through 7 where reference character 1 denotes a pair of fixed brackets for tilting a steering wheel (hereinafter referred to as tilting brackets). Each tilting bracket has an inverted L-like shape in section and is composed of a flat attaching portion 1a and a descending portion 1b. The tilting brackets 1 and 1 are arranged symmetrically with an appropriate space therebetween. The flat attaching portions 1a are secured to a frame member or the like at the front end of a vehicle, such as an automobile. An oblong hole extending vertically is bored in each descending portion 1b.

Reference character 3 denotes a cylindrical steering column. A raising/lowing bracket 6 is secured to an appropriate position of the steering column 3 in the axial direction of the column 3. The raising/lowering bracket 6 has a U-like shape in section and is secured as, for example, by welding so that the upper ends of side pieces 6a and 6a can support the steering column 3 at diametrically opposite positions. The raising/lowering bracket 6 possesses sufficient strength so that it will not deform even when external force is applied to both sides of the bracket 6.

A slidable inner cylinder 4 having a telescopic function is loosely and slidably inserted into the steering column 3. A collar 5 made of synthetic resin is interposed as required between the steering column 3 and the inner cylinder 4 so that the cylinder 4 can slide smoothly.

One end (the right-hand end in FIG. 1) of the slidable inner cylinder 4 extends beyond the steering column 3. The steering wheel W is secured to a steering shaft S fixed inside the slidable inner cylinder 4.

Figure 4:
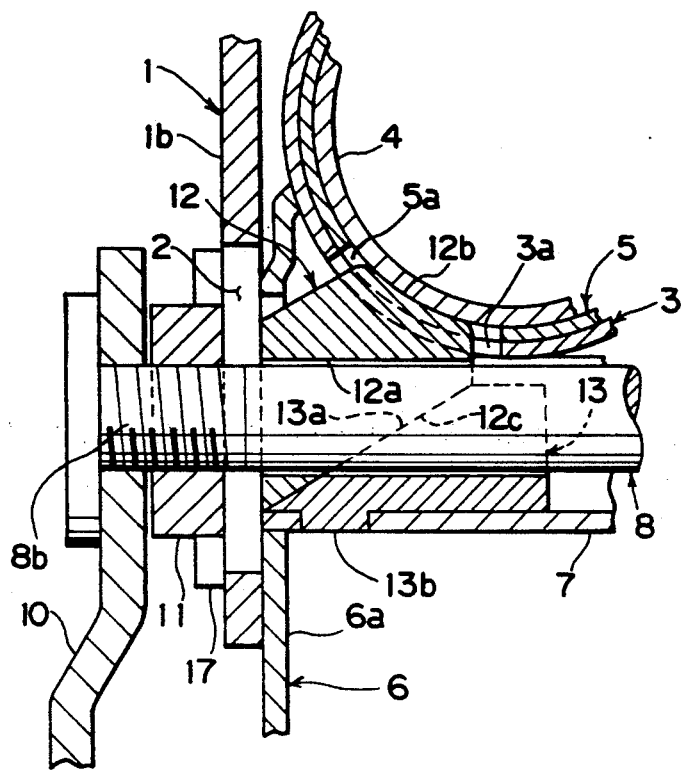
FIG. 4 is an enlarged sectional view of essential components shown in FIG. 3.
Figure 5:
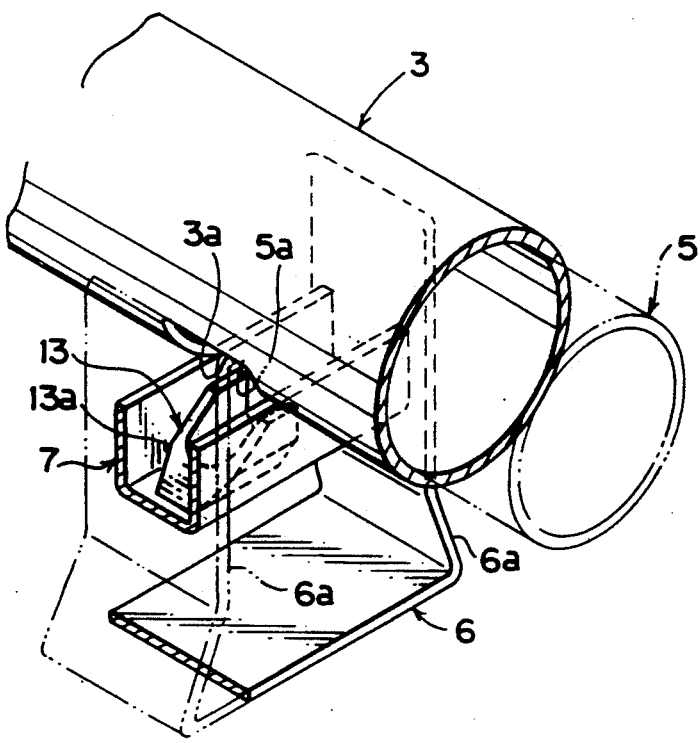
FIG. 5 is a perspective view, with some components omitted, which is similar to FIG. 2.

A guide member 7 is disposed between the side pieces 6a and 6a of the raising/lowering bracket 6. As shown in FIG. 4, the guide member 7 extends straight in the longitudinal direction thereof and has a U-like groove portion in section. It is welded substantially perpendicular to the side pieces 6a and 6a. The groove portion of the guide member 7 faces the steering column 3, and an intermediate portion of the guide member 7 is welded to the outer periphery of the steering column 3. An opening 3a is formed in the outer periphery of the steering column 3, and another opening 5a is formed in the outer periphery of the collar 5. Both openings 3a and 5a are formed at the same position in relation to each other facing the guide member 7.

The raising/lowering bracket 6 secured to the steering column 3 is inserted between the descending portions 1b and 1b of the tilting brackets 1 and 1 facing each other. A screw bar 8 penetrates the oblong holes 2 and 2 of the tilting brackets 1 and 1 and the guide member 7. A threaded portion 8a at one end of the screw bar 8 is screwed in a fixed inside threaded portion 9. More specifically, the fixed inside threaded portion 9 is formed as a nut, and remains locked with respect to the descending portion 1b of one tilting bracket 1. The threaded portion 8a, with its head on the left side of FIG. 3 and other drawings, is a left-hand screw. It clamps the raising/lowering bracket 6 when an adjusting lever 10, whose base is secured to the head of the threaded portion 8a, is rotated toward the driver (counterclockwise in FIG. 1).

A base threaded portion 8b of the screw bar 8 is a right-hand screw which is screwed in a fixed nut 11. The threaded portion 8a is first screwed in the fixed inside threaded portion 9, and the fixed nut 11 is then tightened so as not to rotate. The fixed nut 11 is slidable along the oblong dimension of the hole 2. In this embodiment, a rod-like rotation stopper 17 is provided (see FIGS. 3 and 4).

Figure 11:
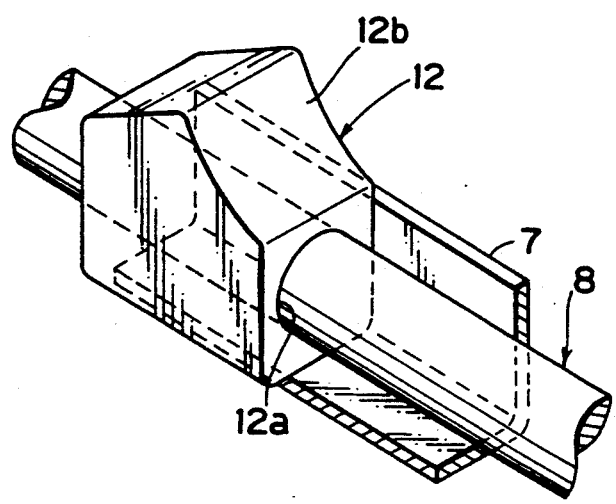
FIG. 11 is a perspective view showing a pressing piece in the third embodiment.

A structure for telescopically fixing the steering column will now be described. As illustrated in FIG. 11, a pressing piece 12 is slidably disposed in the guide member 7. A hole 12a is formed in the pressing piece 12 so that the threaded portion 8a of the screw bar 8 can be loosely inserted into it. One surface (obverse surface) of the pressing piece 12 arcs corresponding to the outer periphery of the slidable inner cylinder 4. The obverse surface is formed as a pressing surface 12b which appropriately pushes the outer periphery of the slidable inner cylinder 4.

Figure 6:
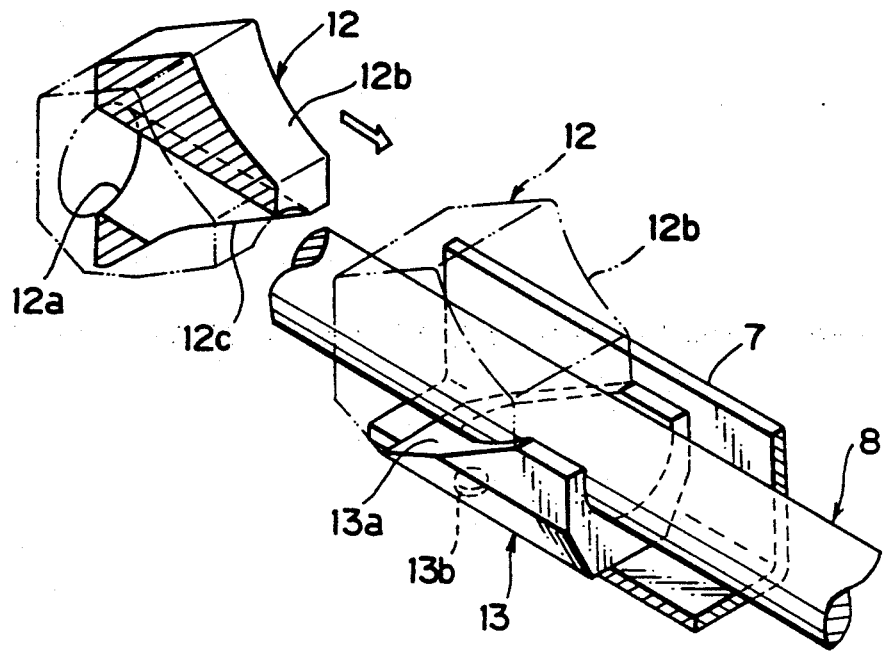
FIG. 6 is an exploded perspective view showing the relationship between a screw bar and a pressing piece in the first embodiment.
Figure 7:
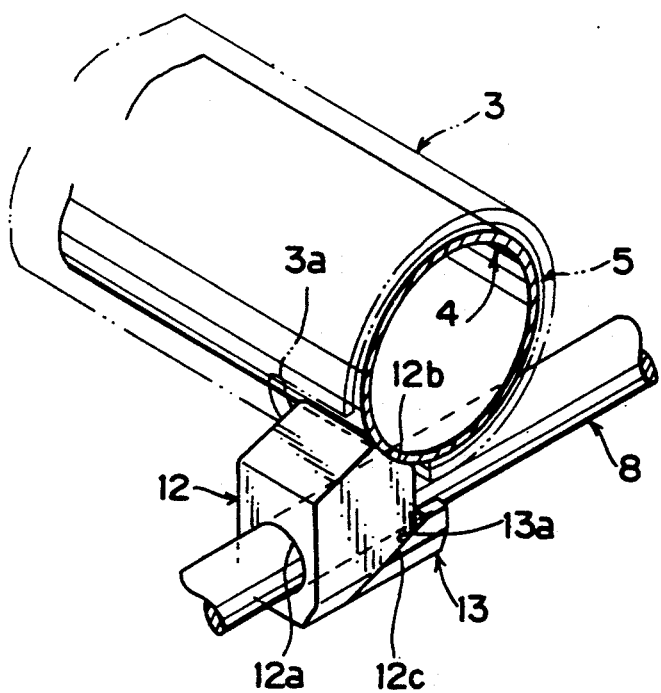
FIG. 7 is a perspective view showing the relationship between a slidable member and the pressing piece in the first embodiment.

As shown in FIGS. 6 and 7, a sloped guide 13 for changing direction is fixed to the inside of the guide member 7. A sloped surface 13a formed on the obverse surface of the sloped guide 13 faces a sloped surface 12c formed on the reverse surface of the pressing piece 12. Both sloped surfaces 12c and 13a are capable of sliding on each other, whereby the pressing piece 12 presses the slidable inner cylinder 4 so that the force being applied to the pressing piece 12 is oriented toward the center of the cylinder 4. A projection 13b is formed on the reverse surface of the sloped guide 13, which projection 13 is inserted and fixed to a hole in the guide member 7.

The first embodiment in operation will now be described.

In a tilting operation, when the adjusting lever 10 is loosened (rotated clockwise in FIG. 1), the descending portions 1b and 1b of the tilting brackets 1 and 1, which always tend to widen outwardly, are slightly widened (actually to approximately 0.5 mm). Thereby the raising/lowering bracket 6 can be freely raised or lowered, and stopped at an appropriate height for the tilting operation.

In a telescoping operation, when the pressing surface 12b of the pressing piece 12 is slightly away from the outer periphery of the slidable inner cylinder 4, the steering wheel W is slid to a desired position with respect to the steering column 3.

After the steering wheel W has been adjusted to a desired position by the tilting and telescoping operations, the adjusting lever 10 is tightened (rotated counterclockwise in FIG. 1), thereby fastening the descending portions 1b and 1b of the tilting brackets 1 and 1, which in turn press and fix the side pieces 6a and 6a of the raising/lowering bracket 6.

While the descending portions 1b and 1b are being fastened, the pressing piece 12 is pushed, whereby the pressing surface 12b pushes and fixes the outer periphery of the slidable inner cylinder 4.

The following advantages are obtained with the first embodiment described above.

The threaded portion 8a and the base threaded portion 8b are inverse screws, and the fixed inside threaded portion 9 and the fixed nut 11 are provided at both ends of the screw bar 8 so as to correspond to the threaded portions 8a and 8b. Because of such a structure, when the adjusting lever 10 is rotated toward the driver as described above, the fixed inside threaded portion 9 and the fixed nut 11 are both tightened, thus clamping the descending portions 1b and 1b. The tilting and telescoping operations can be simultaneously performed to fix or loosen the steering wheel even when the adjusting lever 10 is rotated through a small angle.

Also, because of the provision of the sloped guide 13, the sloped surface 12c slides on the sloped surface 13a of the guide 13, whereby force exerted on the pressing piece 12 is oriented toward the center of the slidable inner cylinder 4 in accordance with the angle of the sloped surface 13a. In other words, the force exerted on the piece 12 approaches the center of the cylinder 4. Consequently, the slidable inner cylinder 4 can be fixed, not with the eccentric force which provides the cylinder 4 with strain and the like, but with the force with which the cylinder 4 is pressed reliably.

Figure 8:
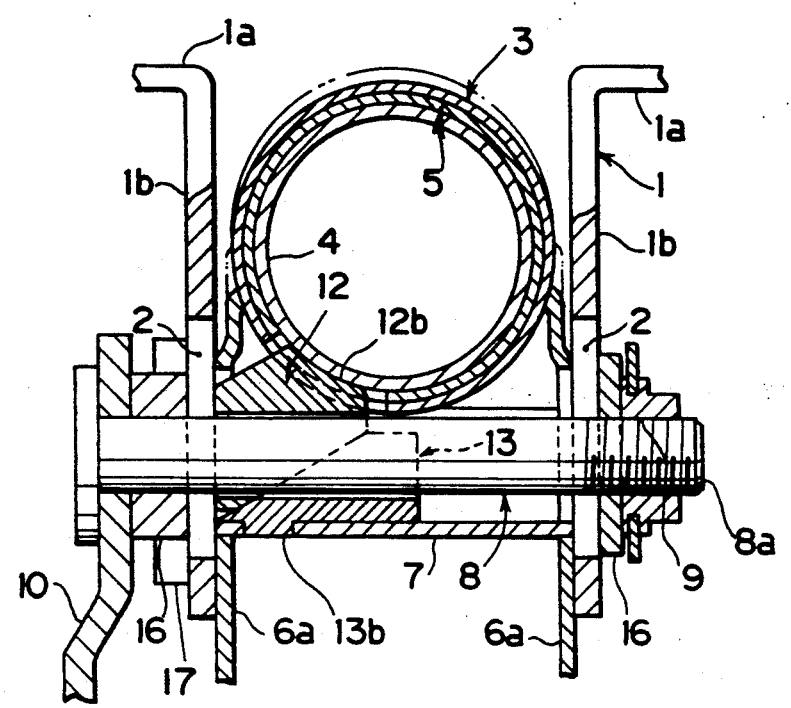
FIG. 8 is a vertical sectional view essentially showing a second embodiment.

A second embodiment of this invention will be described below with reference to FIG. 8. In this embodiment, only one end of a screw bar 8 is threaded serving as a threaded portion 8a, whereas the other end of the bar 8 is not threaded. This is a unique feature of this embodiment, different from the first embodiment. In the second embodiment, a washer 16 is interposed between the base of an adjusting lever 10 and a descending portion 1b of a tilting bracket 1, both lever 10 and the portion 1b being situated on the side of the head of the screw bar 8.

The same operations and advantages as those described in the first embodiment can be obtained in the second embodiment. In addition, the structure of the screw bar 8 can be simplified more than in the first embodiment.

Figure 9:
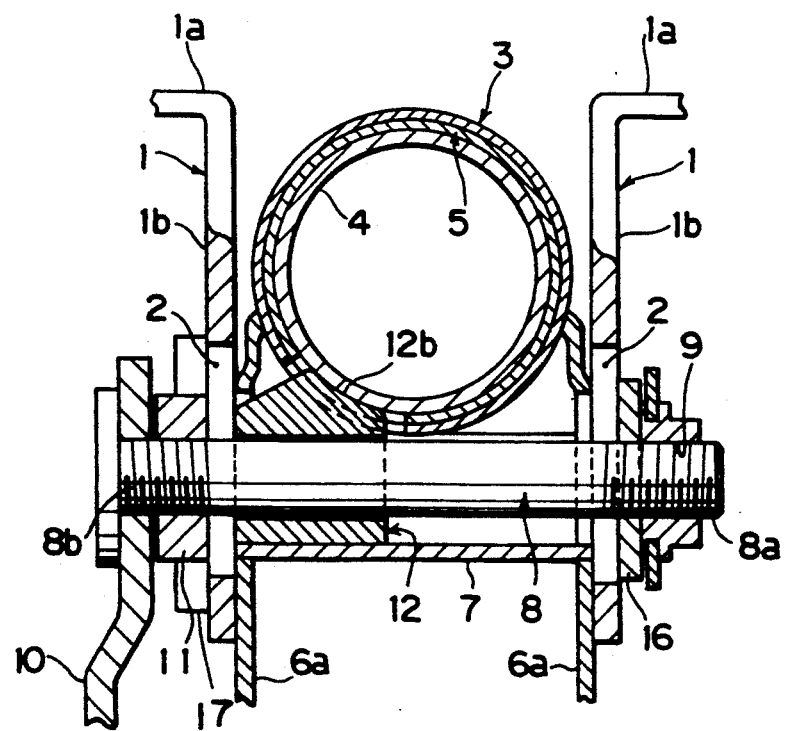
FIG. 9 is a vertical sectional view essentially showing a third embodiment.
Figure 10:
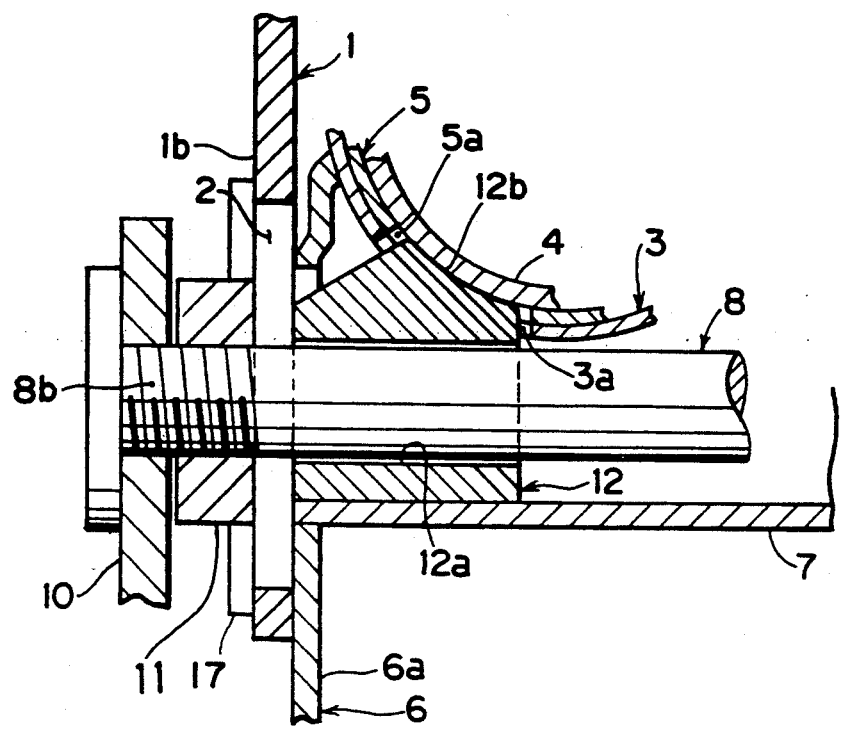
FIG. 10 is an enlarged sectional view of essential components shown in FIG. 9.

FIGS. 9 through 11 show a third embodiment where a pressing piece 12 and a guide member 13 are integrally formed in a single structure. This is a feature of this embodiment. In such a structure, the same operations and advantages as those mentioned in the above embodiments can be obtained equally. It is expected that the number of components will decrease.

Figure 12:
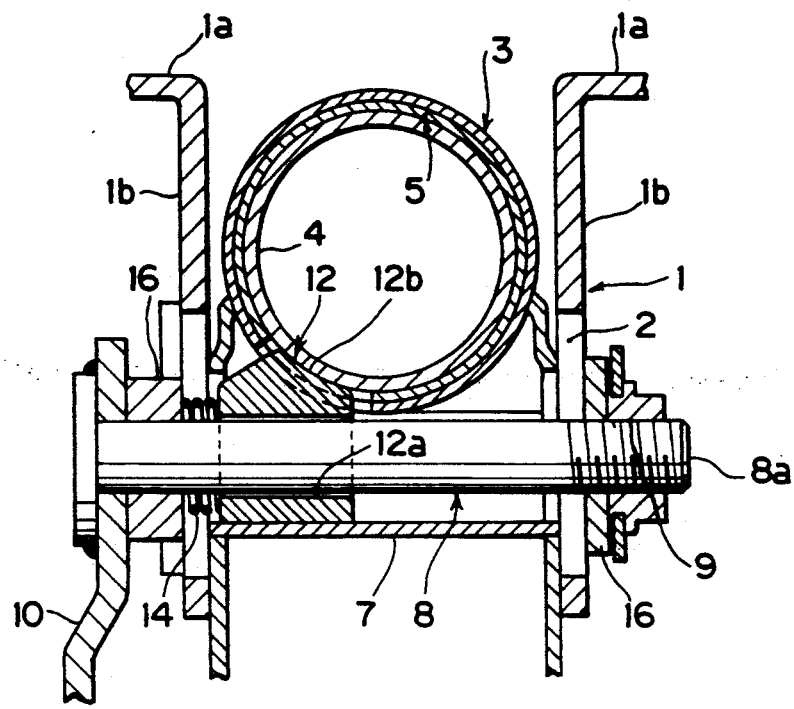
FIG. 12 is a vertical sectional view essentially showing a fourth embodiment.
Figure 13:
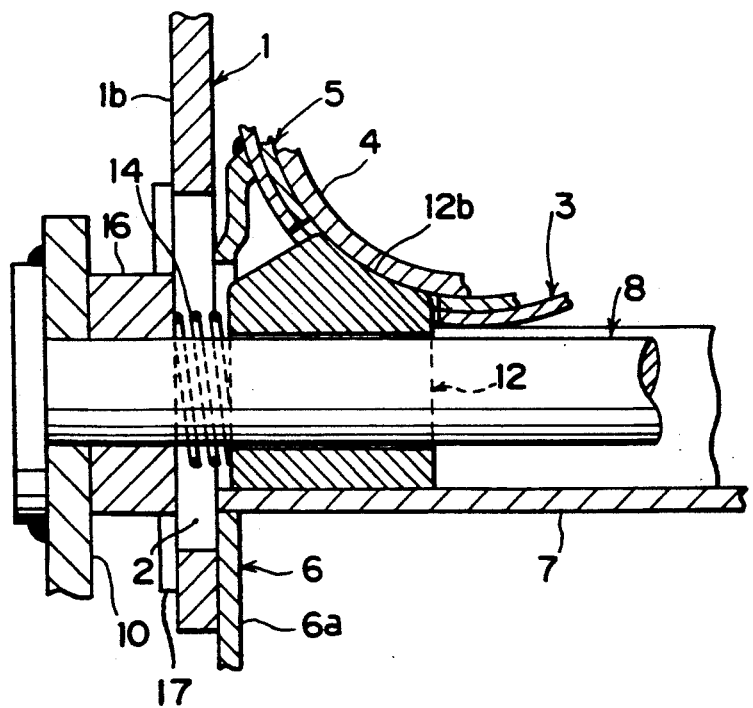
FIG. 13 is an enlarged sectional view of essential components shown in FIG. 12.

FIGS. 12 and 13 illustrate a fourth embodiment where a coiled spring 14, acting as an elastic member, is interposed between a washer 16 and a pressing piece 12, both components being positioned on the side of the head of a screw bar 8. This is a unique feature of the fourth embodiment. Force exerted on the coiled spring 14 maintains, at a constant level, pressing force being applied to the pressing piece 12 which pushes a slidable inner cylinder 4.

Other than a coiled spring, an initially coned disc spring 14 as shown in FIGS. 14 and 15, which show a fifth embodiment, may also be used as an elastic member. In the fifth embodiment, the structure described in the first embodiment is combined with the structure described in the fourth embodiment. The same operations and advantages as those in the embodiments mentioned above can be obtained with the combined structure.

Figure 16:
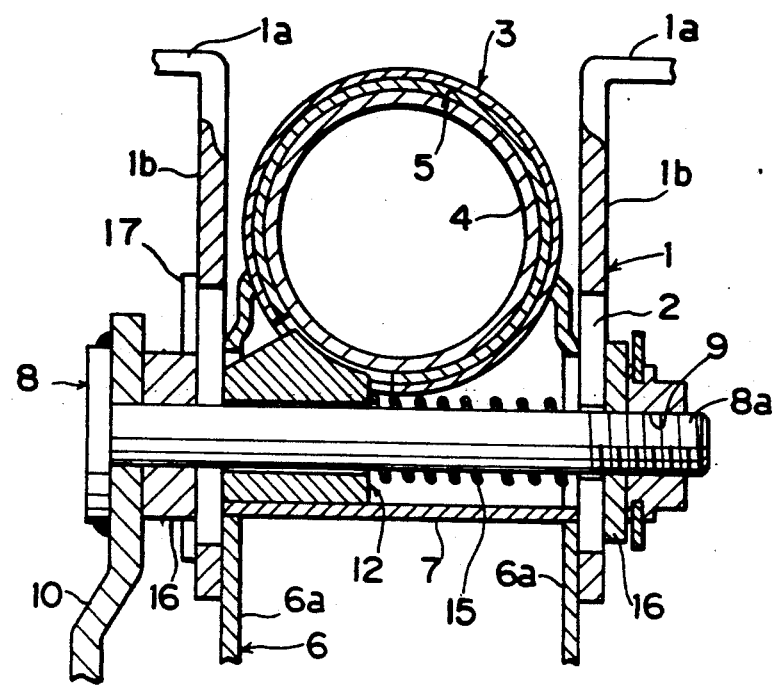
FIG. 16 is a vertical sectional view essentially showing a sixth embodiment.
Figure 17:
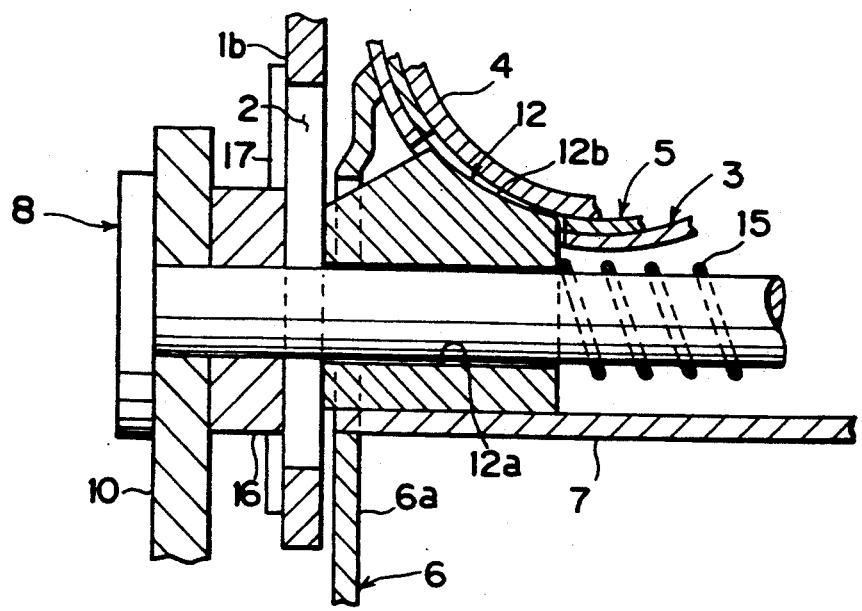
FIG. 17 is an enlarged sectional view of essential components shown in FIG. 15.

FIGS. 16 and 17 show a sixth embodiment where a return spring 5 for moving a pressing piece 12 is provided. This is a feature of this embodiment. As soon as pressing force is released by adjusting lever 10, force exerted on the return spring 15 moves the pressing piece 12 very responsively to such release. In addition to the above advantages, this embodiment provides an advantage in that the pressing piece 12 can be smoothly moved from a slidable inner cylinder 4.

The above-described embodiments of the present invention can be combined appropriately. As long as there is one threaded portion of a screw bar, the same operations and advantages as those mentioned above can be realized in appropriate combinations of the above embodiments.

As has been described above, this invention provides a great advantage in that a steering wheel can be simultaneously tilted (pivotally adjusted) and telescoped (axially adjusted). Such a simple operation enables the steering wheel to be readily adjusted to the position preferred by the driver.

By rotating the adjusting lever 10, the screw bar 8 is tightened to clamp both sides of the raising/lowering bracket 6 (tilt mechanism), while at the same time with the aid of the guide member 7 the pressing piece 12 pushes and fixes the outer periphery of the slidable inner cylinder 4 (telescopic mechanism). In other words, by rotating the screw bar 8, the steering wheel can be tilted and telescoped simultaneously. It is therefore possible to utilize a common structure in both the tilt and telescopic mechanisms, and to considerably reduce cost, the weight and the number of components of the steering device.

What is claimed is:

1. A tilt telescopic steering device, comprising:
a slidable inner cylinder connected to a steering shaft having a steering wheel at one end of the shaft;
a steering column supporting said slidable inner cylinder so that said slidable inner cylinder can move in an axial direction thereof, an opening being formed in a portion of said steering column;
plural fixed tilting brackets, including a pair of descending portions positioned on both sides of said steering column;
a U-shaped raising and lowering bracket disposed inside said descending portions with an open portion of the U-shape facing upward and towards the descending portions, said U-shaped raising and lowering bracket being connected to said steering column to move up and down relative to said fixed tilting brackets;
a guide member on said raising and lowering bracket, extending in a transverse direction to said inner cylinder;
a screw bar penetrating said fixed tilting brackets and said raising and lowering bracket, said raising and lowering bracket being fixed with respect to said fixed tilting brackets by tightening said screw bar; and
a pressing piece supported by said screw bar and being movable along said guide member, a portion of said pressing piece being formed as a surface which is capable of pushing an outer surface of said slidable inner cylinder through the opening in said steering column, said pressing piece being always spring-urged transversely on said screw bar.

2. A tilt telescopic steering device, comprising:
a slidable inner cylinder connected to a steering shaft having a steering wheel at one end of the shaft;
a steering column supporting said slidable inner cylinder so that said slidable inner cylinder can move in an axial direction thereof, an opening being formed in a portion of said steering column;
plural fixed tilting brackets, including a pair of descending portions positioned on both sides of said steering column;
a U-shaped raising and lowering bracket disposed inside said descending portions with an open portion of the U-shape facing upward and towards the descending portion, said U-shaped raising and lowering bracket being connected to said steering column to move up and down relative to said fixed tilting brackets;
a guide member on said raising and lowering bracket, extending in a generally transverse direction to said inner cylinder, said guide member including a sloped guide having a guide surface;
a screw bar penetrating said fixed tilting brackets and said raising and lowering bracket, said raising and lowering bracket being fixed with respect to said fixed tilting brackets by tightening said screw bar; and
a pressing piece supported by said screw bar and guided by said guide surface so as to provide a pressing force toward a center of said inner cylinder, a portion of said pressing piece being formed as a surface which is capable of pushing an outer surface of said slidable inner cylinder through the opening in said steering column.

3. A tilt telescopic steering device according to claim 2, wherein threaded portions facing opposite directions are formed in two positions in an axial direction of said screw bar, nuts being screwed in these threaded portions and provided fixedly with respect to said descending portions.

4. A tilt telescopic steering device according to claim 2, wherein a threaded portion is formed in one position in the axial direction of said screw bar, a nut being screwed in this threaded portion and provided fixedly with respect to said descending portion.

5. A tilt telescopic steering device, comprising:
a slidable inner cylinder connected to a steering shaft having a steering wheel at one end of the shaft;

a steering column supporting said slidable inner cylinder so that said slidable inner cylinder can move in an axial direction thereof, an opening being formed in a portion of said steering column;

plural fixed tilting brackets, including a pair of descending portions positioned on both sides of said steering column;

a U-shaped raising and lowering bracket disposed inside said descending portions with an open portion of the U-shape facing upward, said U-shaped raising and lowering bracket being connected to said steering column to move up and down relative to said fixed tilting brackets;

a guide member on said raising and lowering bracket, extending in a transverse direction to said inner cylinder;

a screw bar penetrating said fixed tilting brackets and said raising and lowering bracket, said raising and lowering bracket being fixed with respect to said fixed tilting brackets by tightening said screw bar; and a pressing piece supported by said screw bar and being movable along said guide member, a portion of said pressing piece being formed as a surface which is capable of pushing an outer surface of said slidable inner cylinder through the opening in said steering column, said pressing piece being always spring-urged toward said slidable inner cylinder.

* * * * *